M. T. GLAESER.
EGG TRAY FOR INCUBATORS.
APPLICATION FILED JUNE 3, 1912.

1,051,575.

Patented Jan. 28, 1913.

Witnesses:
J. C. Devik
George L. Chindahl

Inventor:
Martin T. Glaeser.
By Luther L. Miller
Atty.

UNITED STATES PATENT OFFICE.

MARTIN T. GLAESER, OF CHICAGO, ILLINOIS.

EGG-TRAY FOR INCUBATORS.

1,051,575.

Specification of Letters Patent. Patented Jan. 28, 1913.

Application filed June 3, 1912. Serial No. 701,150.

*To all whom it may concern:*

Be it known that I, MARTIN T. GLAESER, a citizen of the United States, residing at Chicago, in the county of Cook and State of Illinois, have invented certain new and useful Improvements in Egg-Trays for Incubators, of which the following is a specification.

This invention relates to a tray or frame for supporting eggs within an incubator, the tray being so constructed as to permit of mechanically turning the eggs at desired intervals.

The invention relates particularly to egg trays comprising a frame in which a plurality of rollers are rotatably supported, the rollers providing supports for the eggs, whereby when the rollers are rotated the eggs will be caused to turn.

One of the objects of this invention is to provide means to permit of withdrawing the rollers from the frame of the egg tray, in order that no obstruction may be presented to the movements of the newly-hatched chicks.

Another object of the invention is to provide such a construction that water vapor from a suitable container placed below the tray may readily reach all the eggs.

A further object is to provide a construction which shall be entirely sanitary.

Figure 1:
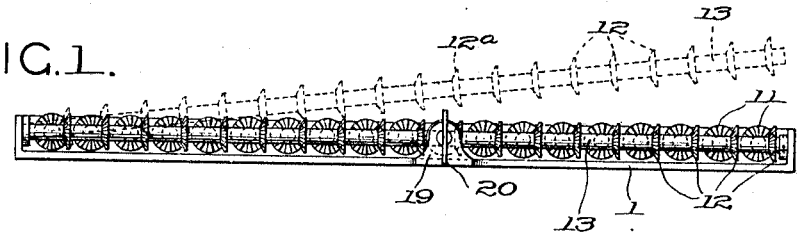
Figure 2:
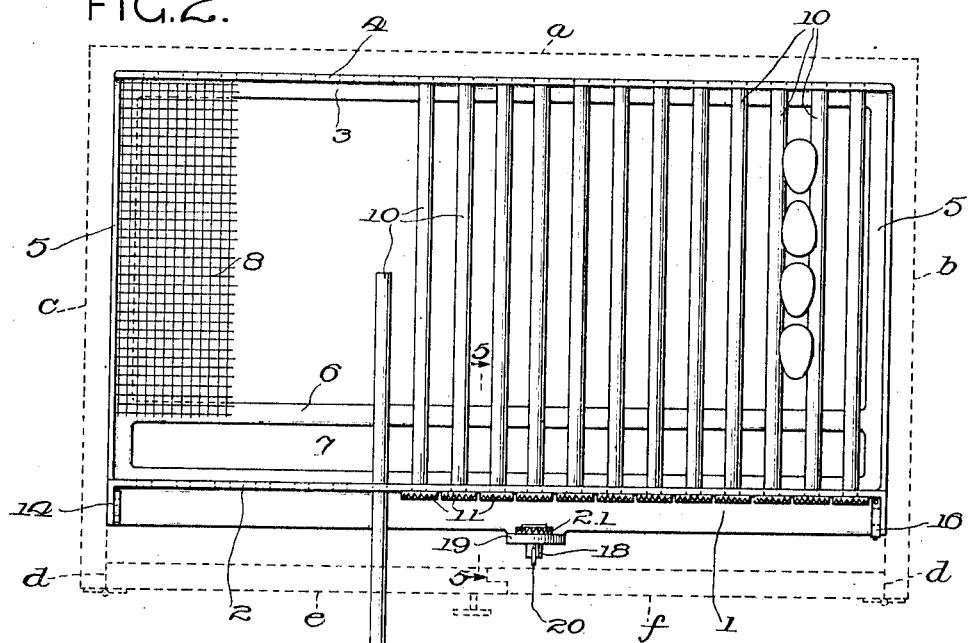
Figure 3:
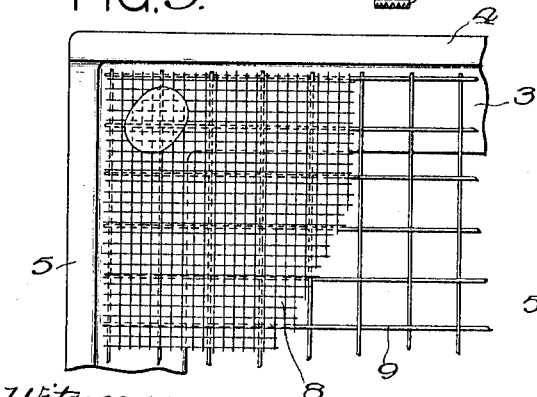
Figure 4:
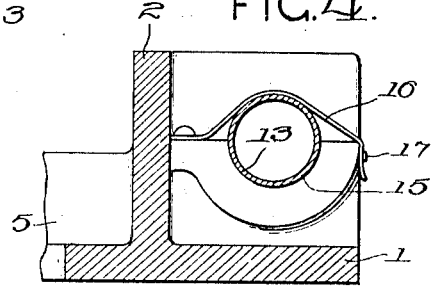
Figure 5:
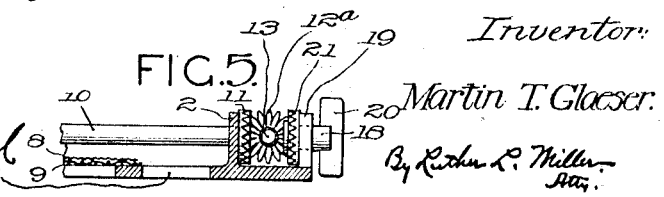

In the accompanying drawings, Figure 1 is a front edge elevation of an egg tray embodying the features of my invention. Fig. 2 is a top plan view of the tray with portions omitted. Fig. 3 is a fragmental detail view illustrating the construction of the bottom of the tray. Fig. 4 is a view of one of the bearings for the operating shaft. Fig. 5 is a fragmental section through the tray.

Egg trays embodying my invention may be of any shape or size to adapt them for use in various forms of incubators. In Fig. 2 I have indicated in dotted lines the walls of an incubator, *a* being the rear wall and *b* and *c* the side walls. In the front wall of the incubator is an opening *d* affording access to the egg chamber, said opening being normally closed by any suitable closure means, such as the hinged doors *e f*. The opening *d* is of such size as to permit of placing the egg tray in and withdrawing it from the incubator.

It will be understood that the incubator walls and doors may be of any suitable construction, and that the egg tray may be supported at its edges in the egg chamber upon the usual ledges (not herein shown) or by any preferred means.

The egg tray comprises a rectangular frame which, if desired, may be an integral casting, said frame comprising a front bar 1 having an upstanding flange 2, the rear bar 3 having a vertical flange 4, the side bars 5 and a bar 6 extending parallel with the front bar 1 and spaced therefrom a suitable distance to provide an opening 7 through which the chicks may pass from the egg tray to the chamber below. The bottom or floor of the egg tray is below the plane of the rollers 10 and is preferably made of wire netting. Herein I have shown an upper layer 8 of wire cloth of relatively fine mesh, and a supporting layer 9 of heavier and larger-mesh wire netting. These layers may be secured to the frame to cover the space between the bars 3, 5 and 6 in any preferred way, as by means of solder. For the sake of clearness, the greater portion of the tray bottom is omitted in Fig. 2.

A plurality of parallel rollers 10 are rotatably mounted in the flanges 2 and 4, said rollers being preferably spaced equal distances apart, said distances being less than the length of the shorter axis of the eggs so that eggs may be supported upon said rollers, as indicated in Fig. 2. It will be seen that when the rollers are simultaneously rotated in the same direction, the eggs resting thereon will be simultaneously turned in the opposite direction. To impart such rotation to the rollers, each is provided at its forward end with a gear wheel 11 each adapted to mesh with a corresponding gear wheel 12 fixed upon an operating shaft 13 extending at right angles to the rollers 10. The gear wheels 11 lie between the flange 2 and the gears 12. The operating shaft is omitted in Fig. 2. It may be mounted in any suitable way; herein I have shown one end as lying in a bearing 14 and the other end as being supported in a bearing socket 15. Since the operating shaft lies in the plane of the rollers 10, said operating shaft must be withdrawn or moved aside before the rollers 10 can be removed from the tray. One of the bearings for the operating shaft is therefore arranged to be conveniently opened to permit of withdrawing the operating shaft. Herein I have shown the shaft as being releasably held against upward displacement from the socket 15 by means of a spring arm 16 secured at one end to the egg tray frame and hooked at its other end over a locking stud 17. Any other suitable bearing may, however, be used to permit of the convenient removal of the operating shaft.

The operating shaft may be rotated by any preferred means. In this instance I have shown a short shaft 18 rotatably mounted in a bracket or lug 19 on the egg tray frame, said shaft being provided at its outer end with a handle or finger portion 20 and at its inner end with a gear wheel 21 adapted to mesh with the adjacent gear wheel 12$^a$ on the operating shaft.

In use, the series of rollers 10 may be synchronously rotated through, say, a half-revolution, at desired intervals during the period of incubation, such rotation of the rollers causing a partial rotation of the eggs. Near the close of the period of incubation, say, two or three days before the time of hatching, the rollers 10 may, if desired, be withdrawn. This is accomplished by raising the spring arm 16, lifting the shaft out of the bearing socket 15, as indicated in dotted lines in Fig. 1, and withdrawing said operating shaft from the bearing 14 and from the incubator. The rollers 10 may now be drawn longitudinally out of their bearings, the withdrawal of said rollers permitting the eggs to settle onto the bottom of the tray. After the withdrawal of the rollers the eggs lie upon a plane surface upon which the chicks may easily make their way to the exit opening 7 and thence to the chamber provided therebelow for their reception.

It is customary to provide in the chamber below the egg tray a vessel containing water, the evaporation of the water providing the moisture necessary for the successful incubation of the eggs. It will be seen that by reason of the open-mesh construction of the bottom of the tray the water vapor may pass directly through said bottom from the water container to the eggs. Being constructed entirely of metal, the tray does not absorb impurities and may be readily cleaned and sterilized whenever desired.

The rollers 10, shaft 13 and driving means 18 20 21 being carried by the frame of the tray, it will be seen that the whole forms a unitary egg tray structurally independent of the incubator and adapted for application to any incubator of suitable size; in other words, the tray constitutes a complete article of manufacture.

I would have it understood that the invention is not confined to the details above set forth, for various modifications will occur to persons skilled in the art.

I claim as my invention:

1. An egg tray comprising a frame, a plurality of substantially parallel egg-supporting rollers rotatably mounted in said frame and longitudinally withdrawable therefrom, an operating shaft rotatably mounted in said frame and extending transversely of said rollers, said operating shaft being laterally withdrawable from said frame, coacting drive elements mounted on said operating shaft and said rollers, and means for turning said operating shaft.

2. The combination, with an incubator having an opening giving access to its interior, and closure means for said opening, of an egg tray adapted for insertion into and withdrawable from the incubator through said opening, said tray comprising a frame, egg-supporting rollers mounted in said frame and longitudinally withdrawable from the frame through said opening, a shaft having a separable driving connection with said rollers, said shaft being rotatably mounted in said frame and being withdrawable through said opening, and means on said frame for turning said operating shaft.

In testimony whereof I hereunto affix my signature in the presence of two witnesses.

MARTIN T. GLAESER.

Witnesses:
ALBERT V. HABERER,
OTTO J. ZORN.

---

Copies of this patent may be obtained for five cents each, by addressing the "Commissioner of Patents, Washington, D. C."